(12) United States Patent
Zhang et al.

(10) Patent No.: US 8,762,461 B2
(45) Date of Patent: Jun. 24, 2014

(54) METHOD, SYSTEM AND DEVICE FOR SEARCHING ACTIVE PEER IN P2P STREAMING MEDIA SYSTEM

(75) Inventors: Yunfei Zhang, Beijing (CN); Jin Peng, Beijing (CN); Xiaodong Duan, Beijing (CN); Guangqing Deng, Beijing (CN); Jiadong Hao, Beijing (CN); Bing Wei, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 143 days.

(21) Appl. No.: 13/378,982

(22) PCT Filed: Jun. 13, 2010

(86) PCT No.: PCT/CN2010/000863
§ 371 (c)(1),
(2), (4) Date: Feb. 23, 2012

(87) PCT Pub. No.: WO2010/145199
PCT Pub. Date: Dec. 23, 2010

(65) Prior Publication Data
US 2012/0151051 A1 Jun. 14, 2012

(30) Foreign Application Priority Data

Jun. 17, 2009 (CN) .......................... 2009 1 0086675
Jun. 17, 2009 (CN) .......................... 2009 1 0086676

(51) Int. Cl.
*G06F 15/16* (2006.01)
(52) U.S. Cl.
USPC ......................................... 709/204; 709/219
(58) Field of Classification Search
USPC ......................................... 709/204, 219, 224
See application file for complete search history.

(56) References Cited

U.S. PATENT DOCUMENTS

2004/0122741 A1* 6/2004 Sidman ........................... 705/26
2006/0190615 A1 8/2006 Panwar et al.
(Continued)

FOREIGN PATENT DOCUMENTS

| CN | 101286927 | 10/2008 |
| EP | 2053859 | 4/2009 |
| WO | WO2008117295 | 10/2005 |

OTHER PUBLICATIONS

PCT/CN2010/000863, Sep. 23, 20010, International Search Report.

*Primary Examiner* — Lance L Barry
(74) *Attorney, Agent, or Firm* — Workman Nydegger

(57) ABSTRACT

Disclosed is a method, system and device for searching active nodes in P2P(peer to peer) streaming media system. Selectable nodes briefly and efficiently report their own subblocks information to a tracker device, such as the number of the continuous buffered subblocks, the sequence number of the first subblock of the continuous subblocks and the total number information of the buffered subblocks; the tracker device can select suitable candidate nodes for a request node according to the subblocks information of the selectable nodes, therefore the request node can determine active nodes without sending a large amount of detections to the candidate nodes; the waste of communication resources is avoided and the bandwidth cost is reduced; also, the selectable nodes can report characters of the networks where they locate, and the tracker device can select nodes in wired network to be candidate nodes first, therefore, the transmission speed of the whole P2P system is improved and the waiting delay of the request node is reduced.

4 Claims, 5 Drawing Sheets

(56) References Cited

U.S. PATENT DOCUMENTS

| | | | |
|---|---|---|---|
| 2006/0224760 A1* | 10/2006 | Yu et al. | 709/231 |
| 2006/0230107 A1* | 10/2006 | Yu et al. | 709/204 |
| 2008/0155120 A1* | 6/2008 | Argawal et al. | 709/242 |
| 2012/0151051 A1* | 6/2012 | Zhang et al. | 709/224 |

\* cited by examiner

--Prior Art--

METHOD, SYSTEM AND DEVICE FOR SEARCHING ACTIVE PEER IN P2P STREAMING MEDIA SYSTEM

CROSS-REFERENCE TO RELATED APPLICATIONS

This Patent Application is a U.S. National Stage of International Application No. PCT/CN2010/000863, filed on Jun. 13,2010, which claims the benefits of CN Application No. 200910086675.1 entitled "METHOD, SYSTEM AND DEVICE FOR SEARCHING ACTIVE PEER IN P2P STREAMING MEDIA SYSTEM" and CN Application No. 200910086676.6 entitled "METHOD, SYSTEM AND DEVICE FOR SEARCHING ACTIVE PEER IN P2P STREAMING MEDIA SYSTEM", both filed on Jun. 17, 2009. All of the aforementioned applications are incorporated herein by reference in their entirety.

FIELD OF THE INVENTION

The present application relates to Peer-to-Peer (P2P) technologies, and in particular, to a method, a system and a device for searching an active peer in a P2P streaming media system.

BACKGROUND OF THE INVENTION

Due to its favorable extensibility and robustness, a Peer-to-Peer (P2P) system has become a perfect platform for developing streaming media services. In a tracker-based P2P system, there exist a large number of trackers; for different play channels, a tracker buffers peer information, such as an IP address and a port, of peers related to data; a peer that is newly added to the P2P streaming media system needs to report its own peer information, such as an IP address and a port, to the tracker.

A peer that has been added to the P2P streaming media system may send a Peerlist request to the tracker, for indicating that it wants to download data from other peers. A peer that sends a Peerlist request is referred to as a request peer, and a peer that provides download data to the request peer is referred to as an active peer. In the existing tracker-based P2P system, a process in which a request peer searches an active peer is as shown FIG. 1, which includes the following steps.

Step 1: A request peer (Peer_1) sends a Peerlist request to a tracker, the tracker selects a plurality of peers according to the buffered peer information, writes the peer information of the selected peers into a Peerlist and returns the Peerlist to the request peer.

In this step, the tracker may determine the peers according to the buffered peer information, and randomly select a certain number of peers therefrom, or it may select the peers that are adjacent to the request peer according to the principle of geographic location adjacency. For example, if it is determined according to the IP address of the request peer that the home area of the request peer is Beijing, the tracker may select the peers with a home area of Beijing according to the buffered IP addresses, for example, Peer_2, Peer_3, Peer_4 and Peer_5 are selected in FIG. 1.

Step 2: After the request peer receives the Peerlist, it sends sounding information to the peers in the Peerlist for determining the active peer.

In a P2P streaming media system, a play document is divided into several subblocks, and the play document is transmitted between peers in the unit of a subblock, and a peer indicates the situation that it buffers the subblocks via a bitmap. Each bit in the bitmap corresponds to a subblock. If a peer buffers a certain subblock, the bit corresponding to the subblock in the bitmap is set as "1"; otherwise, the bit is set as "0". In this step, the request peer first sends sounding information to a certain peer in the Peerlist; for example, Peer_1 sends sounding information to Peer_2 and queries the connection capability of Peer_2, and when Peer_2 is capable of acting as an active peer of Peer_1, Peer_1 and Peer_2 interchange their own bitmaps and learn the situation of buffered subblocks of the opposite party. Peer_2 determines according to the received bitmap whether the subblocks it buffers can be provided to Peer_1, if yes, it sends successful response information to Peer_1; otherwise, it sends failed response information to Peer_1.

Additionally, the request peer and the peers in the Peerlist may interchange their Peerlists for enlarging the searching area of the active peers.

By the above two steps, the request peer accomplishes the process of searching the active peer, and then Step 3 may be performed: the request peer Peer_1 downloads data from the active peer Peer_2 and prepares to play a video.

In the mode for searching an active peer in the existing tracker-based P2P system, because the tracker only knows the peer information, such as an IP address and a port, of a selectable peer, a peer in the Peerlist may be a peer buffering less available subblocks, which makes the request peer need to send sounding information to each peer in the Peerlist respectively, thus the request peer may need to occupy a large number of communication resources to search a suitable active peer, and the communication resources may be wasted. Moreover, because the tracker does not know the characters of the networks in which the peers in the system exist, it only coarsely selects a peer according to the physical addresses of the peers, thus the peer corresponding to the peer information in the Peerlist received by the request peer is likely a peer with a low data transmission speed. When such a peer with a low data transmission speed becomes an active peer of the request peer, the data transmission efficiency will be low, thereby the average delay required by the request peer to play streaming media data will be increased.

SUMMARY OF THE INVENTION

It is an object of the embodiments of the invention to provide a method, a system and a device for searching an active peer in a P2P streaming media system, thereby solving the problem during the process of searching an active peer that a request peer needs to send sounding information to each peer in a Peerlist for searching a suitable active peer, which wastes the communication resources.

A method for searching an active peer in a P2P streaming media system, wherein, a selectable peer reports the number of continuous subblocks buffered and a sequence number of the first subblock of the continuous subblocks to a tracker;

the method for searching an active peer includes:

receiving, by the tracker, a Peerlist request sent by a request peer, selecting a plurality of selectable peers as candidate peers according to a sequence number of a starting subblock of data to be downloaded by the request peer which is contained in the Peerlist request, wherein, the starting subblock of the data to be downloaded is buffered in the candidate peers; and returning, by the tracker, peer information of the candidate peers to the request peer via a Peerlist, and indicating the request peer to determine at least one candidate peer as an active peer according to the peer information in the Peerlist.

A system for searching an active peer in a P2P streaming media system, including a request peer, a selectable peer and a tracker, wherein:

the selectable peer is configured to report the number of continuous subblocks buffered and a sequence number of the first subblock of the continuous subblocks to the tracker;

the request peer is configured to send a Peerlist request to the tracker and determine at least one candidate peer as an active peer according to peer information in a Peerlist returned by the tracker; and the tracker is configured to select a plurality of selectable peers as candidate peers according to a sequence number of a starting subblock of data to be downloaded by the request peer which is contained in the Peerlist request after receiving the Peerlist request, wherein the candidate peers buffer the starting subblock of the data to be downloaded, and return peer information of the candidate peers selected to the request peer via a Peerlist.

A tracker, applicable to a P2P streaming media system, including:

a request receiving module, configured to receive a Peerlist request, wherein the Peerlist request contains a sequence number of a starting subblock of data to be downloaded by a request peer;

an information receiving module, configured to receive the number of continuous subblocks buffered and a sequence number of the first subblock of the continuous subblocks that are reported by a selectable peer;

a first selecting module, configured to select a plurality of selectable peers as candidate peers according to the sequence number of the starting subblock of the data to be downloaded, wherein, the candidate peer buffer the starting subblock of the data to be downloaded; and a list sending module, configured to return peer information of the candidate peers selected to the request peer via a Peerlist.

A peer device, including:

an information reporting module, configured to report the number of continuous subblocks buffered and a sequence number of the first subblock of the continuous subblocks to a tracker; and a data output module, configured to upload data to other peer devices according to requests from other peer devices.

Because in the solution of the embodiments of the invention, the tracker receives the number of continuous subblocks buffered by a selectable peer and the sequence number of the first subblock of the continuous subblocks in advance, it can known the available subblock information of the selectable peer by receiving the information that occupies only a few bytes, so that it can guarantee that the starting subblock of the data to be downloaded is buffered in the candidate peers selected when the candidate peers are selected according to the sequence number of a starting subblock of the data to be downloaded that is requested by the request peer, thus when the request peer determines an active peer from the candidate peers, it does not need to sound to each candidate peer whether there exists the sequence number of the starting subblock of the data to be downloaded. Therefore, the waste of communication resources may be avoided, and the bandwidth consumption may be reduced.

It is another object of the embodiments of the invention to provide a method, a system and a device for searching an active peer in a P2P streaming media system, thereby solving the problem that during the process of determining an active peer, when the transmission speed of a peer corresponding to the peer information in the Peerlist is low, the data transmission efficiency is low.

A method for searching an active peer in a P2P streaming media system, wherein a selectable peer reports information of a network in which the selectable peer lies to a tracker;

the method for searching an active peer includes:

receiving, by the tracker, a Peerlist request sent by a request peer, determining the number of selectable peers that lie in wired networks according to the information of the network in which the selectable peer lies, if the number of selectable peers that lie in wired networks is no less than the number of candidate peers required, selecting candidate peers from the selectable peers that lie in wired networks; if the number of selectable peers that lie in wired networks is less than the number of candidate peers required, taking all the selectable peers that lie in wired networks and at least one selectable peer that lies in a wireless network as candidate peers; and returning, by the tracker, peer information of the candidate peers selected to the request peer via a Peerlist, and indicating the request peer to determine at least one candidate peer as an active peer according to the peer information in the Peerlist.

A system for searching an active peer in a P2P streaming media system, including:

a selectable peer, configured to report information of a network in which the selectable peer lies to a tracker;

a request peer, configured to send a Peerlist request to the tracker and determine at least one candidate peer as an active peer according to peer information in a Peerlist returned by the tracker; and the tracker, configured to receive the Peerlist request, determine the number of selectable peers that lie in wired networks according to the information of the network in which the selectable peer lies, if the number of selectable peers that lie in wired networks is no less than the number of candidate peers required, select candidate peers from the selectable peers that lie in wired networks; if the number of selectable peers that lie in wired networks is less than the number of candidate peers required, take all the selectable peers that lie in wired networks and at least one selectable peer that lies in a wireless network as candidate peers, and return the peer information of the candidate peers selected to the request peer via the Peerlist.

A tracker, applicable to a P2P streaming media system, including:

an information receiving module, configured to receive information of a network in which a selectable peer lies reported by the selectable peer;

a request receiving module, configured to receive a Peerlist request;

a selecting module, configured to determine the number of selectable peers that lie in wired networks according to the information of the network in which the selectable peer lies, if the number of selectable peers that lie in wired networks is no less than the number of candidate peers required, select candidate peers from the selectable peers that lie in wired networks; if the number of selectable peers that lie in wired networks is less than the number of candidate peers required, take all the selectable peers that lie in wired networks and at least one selectable peer that lies in a wireless network as candidate peers; and a list sending module, configured to return peer information of the candidate peers selected to a request peer via a Peerlist.

A peer device, including:

an information reporting module, configured to report information of a network in which the peer device lies to a tracker; and a data output module, configured to upload data to other peer devices according to requests from other peer devices.

Because in the solution of the embodiments of the invention, when the tracker determines the candidate peers for a request peer, it screens the selectable peers according to the character of the networks in which the selectable peers lie, and preferably selects the peers that lie in wired networks. Considering that, under normal situations, the transmission speed of the peers in wired network is fast, the data transmission speed of the active peers determined by the request peer according to the peer information in the Peerlist is relatively high, thus the data transmission efficiency may be improved, and the delay required by the request peer to play streaming media data may be reduced.

DETAILED DESCRIPTION OF THE EMBODIMENTS

To attain the objects of the invention, in the embodiments of the invention, the selectable peer and the tracker in the system are reconstructed, so that the selectable peer may report availability information of subblocks it buffers to the tracker; after the tracker receives a Peerlist request sent by a request peer, it does not blindly take the selectable peers in the system as the candidate active peers of the request peer, instead, it selects the selectable peers according to the availability information of the buffered subblocks of the selectable peers, so that it may guarantee that the selected peer buffers the subblock most urgently needed by the request peer, thereby the process in which a request peer determines whether a subblock most urgently needed exists in a peer in the Peerlist by sending a sounding message to the peer in the Peerlist may be eliminated, the waste of communication resources may be avoided, and the bandwidth consumption may be reduced. Moreover, other peers in the P2P system are also screened according to the characters of the networks in which they lie, and the peers that lie in wired networks are preferably selected, so that the data download efficiency at the active peers selected by the request peer from the Peerlist is high.

The tracker concerned in each embodiment of the invention may be a device reconstructed based on an existing tracker, or it may be a device with related functions needed in the embodiments of the invention.

The embodiments of the invention will now be described in detail in conjunction with the drawings.

Embodiment 1

Figure 1:
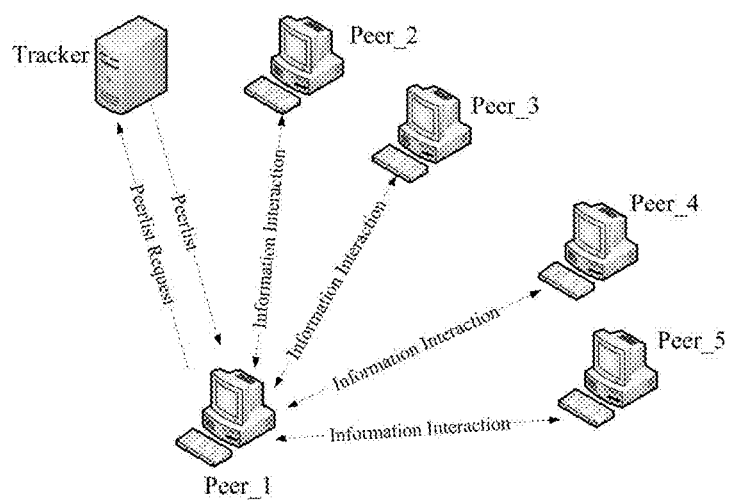
FIG. 1 is a schematic diagram of a process in which a request peer searches an active peer in the prior art.
Figure 2:
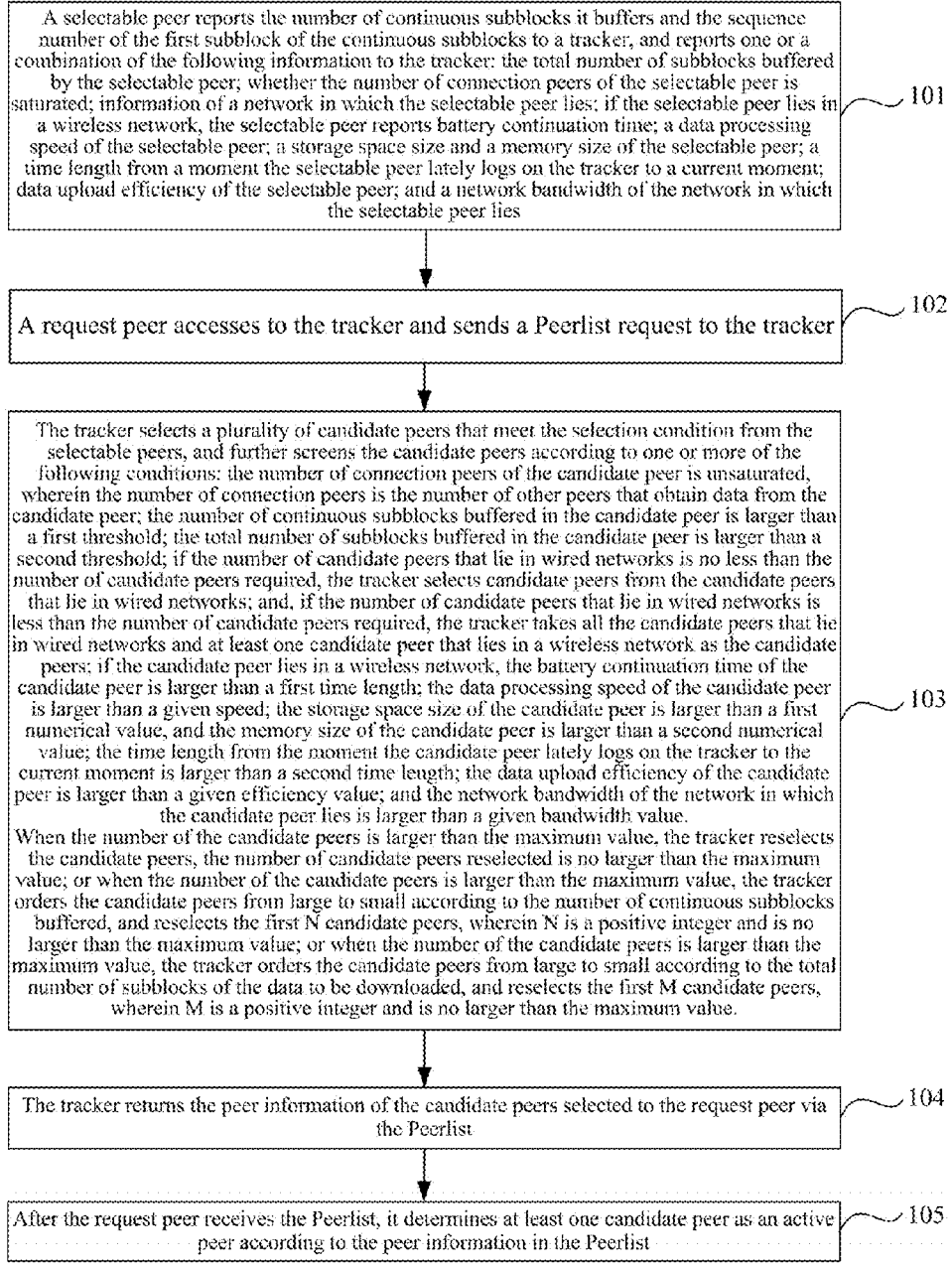
FIG. 2 is a schematic diagram showing steps of a method for searching an active peer according to Embodiment 1 of the invention.

As shown in FIG. 2, it is a schematic diagram showing steps of a method for searching an active peer according to Embodiment 1 of the invention, where the method includes the following steps.

Step 101: A selectable peer reports a number of buffered continuous subblocks and a sequence number of the first subblock of the continuous subblocks to a tracker.

A peer that currently accesses to the tracker may be regarded as a selectable peer.

A selectable peer in the P2P system needs to report the related information of the subblocks it buffers to the tracker periodically or in real time, for example, the locations of subblocks it buffers, that is, at which moments the bits corresponding to the subblocks are set as "1" and at which moments the bits corresponding to the subblocks are set as "0". However, considering that a large number of bytes need to be occupied and excessive resources need to be consumed when all information of the bits is reported to the tracker, in Embodiment 1 of the invention, the selectable peer reports the number of continuous subblocks it buffers and the sequence number of the first subblock of the continuous subblocks to the tracker.

Figure 3:
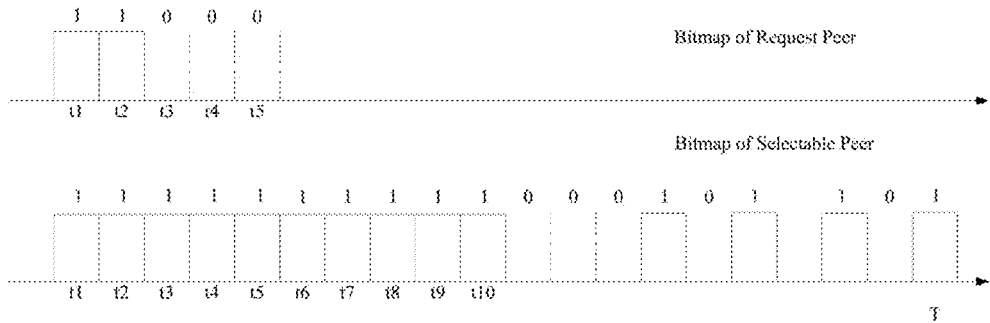
FIG. 3 is a schematic diagram of bitmaps of a request peer and a selectable peer according to Embodiment 1 of the invention.

As shown in FIG. 3, it respectively shows schematic diagrams of the bitmaps of the request peer and a certain selectable peer according to one embodiment of the invention, where it is hypothesized that the two bitmaps are directed to the same time period of the same play document.

It may be seen from FIG. 3 that the selectable peer has a segment of continuous subblocks, of which the number is marked as Counter_One, the amount is 10, and the sequence number of the first subblock is indicated by Offset_One, and the sequence number in FIG. 3 is moment t1. If the offset of selectable peer Bitmap occupies 4 bytes and Counter_One occupies 2 bytes, it may report the information of its own continuous subblocks to the tracker via 6 bytes.

Step 102: A request peer accesses to the tracker and sends a Peerlist request to the tracker.

In this embodiment, the request peer may be a peer that currently accesses to the tracker, or it may be a peer of which the active peers need to be redetermined.

The subblock most urgently needed by the request peer is contained in the Peerlist request, where the subblock most urgently needed may be the first subblock with the bit set as 0 in the non-played data buffered in the request peer. Because when bit is set as "0", it indicates that the subblock is not buffered, the subblock most urgently needed may be regarded as the starting subblock of the data to be downloaded. The sequence number of the starting subblock of the data to be downloaded may be indicated by Offset_Zero.

Furthermore, the request peer may report the information of the subblocks it buffers to the tracker, for example, the number of continuous subblocks it buffers and the sequence number of the first subblock of the continuous subblocks.

Because the information of the subblocks buffered on the selectable peer is saved in the tracker, a selectable peer of which the subblock information buffered meets the requirements may be subsequently selected as a candidate peer for the request peer to select an active peer.

Step 103: The tracker selects a plurality of candidate peers that meet a selection condition from the selectable peers.

The selection condition includes: the candidate peer buffers the starting subblock of the data to be downloaded.

The selection mode of this step may be as follows:

first, the tracker determines which bits in the selectable peer are set as "1" according to the number of continuous subblocks and the sequence number of the first subblock of the continuous subblocks that have been known;

next, it compares the buffered subblocks in the selectable peer with the starting subblock of the data to be downloaded, and determines whether the selectable peer buffers the starting subblock of the data to be downloaded; and finally, the tracker searches the selectable peers that buffer the starting subblock of the data to be downloaded as the candidate peers according to the comparison result.

Again referring to FIG. 3, in the data buffered on the request peer, the first subblock with the bit set as 0 is subblock t3, which indicates that the first subblock the request peer lacks for is the subblock with a sequence number of t3, thus the tracker determines that the selectable peer in FIG. 3 buffers the subblock of moment t3, and this selectable peer may be regarded as a candidate peer; then the selected candidate peer can provide the needed subblock to the request peer.

In order to guarantee the reasonableness of the number of candidate peers selected by the tracker, which can not only make the request peer correctly determine the active peer according to the Peerlist, but also avoid excessive bandwidth consumption due to redundant number of candidate peers, thus the maximum value of the number of candidate peers may be determined according to the actual condition of the current bandwidth or the empirical value. If the number of candidate peers selected by the tracker according to the selection condition is larger than the maximum value, the candidate peers selected will be further selected, so as to guarantee that the number of candidate peers further selected is no larger than the maximum value; for example, the number of candidate peers further selected may be made equal to the maximum value.

Step 104: The tracker returns the peer information of the selected candidate peers to the request peer via the Peerlist.

Step 105: After the request peer receives the Peerlist, it determines at least one candidate peer as an active peer according to the peer information in the Peerlist.

Because in Step 103, the candidate subblocks have been selected according to the condition that "the starting subblock of the data to be downloaded is buffered on the candidate peer", the request peer may verify that all the candidate peers can provide the subblock needed, so that information interaction during the process for determining an active peer may be reduced, and the waste of resources may be decreased.

In this embodiment, the request peer may determine a plurality of active peers according to the peer information in the Peerlist, the purpose of which is to improve the reliability of the system, so that when a service provided to the request peer is interrupted due to a problem occurring on a certain active peer that provides data to the request peer, the request peer may rapidly establish a connection for data transmission with another determined active peer. Because the possibility that the network state of the another active peer changes in a short time is very low, it becomes possible that the another active peer acts as the active peer to provide data to the request peer when a problem occurs on one active peer. However, if the network state of the another active peer has been changed, it will be no longer suitable for acting as the active peer of the request peer, and the request peer will need to again perform the steps of Embodiment 1 of the invention and reselect active peers.

By the solution of Embodiment 1 of the invention, because the tracker selects according to the condition that the subblock most urgently needed by the request peer is buffered, the selected candidate peer can provide the needed subblock to the request peer, that is, the selected candidate peer may act as an active peer of the request peer, and after the request peer receives a Peerlist, it may determine at least one peer therefrom as the active peer. Therefore, information interaction between the request peer and the peer corresponding to the peer information in the Peerlist may be reduced, and the complicated operations at the peer side may be simplified.

Embodiment 2

In order to make a determined active peer be able to continually provide data to be downloaded to the request peer in a certain time, based on Embodiment 1, in Embodiment 2, the selection condition in Step 103 is set as: the candidate peer buffers the starting subblock of the data to be downloaded, and the number of saved continuous subblocks of the data to be downloaded is larger than a first threshold. Here, the continuous subblocks of the data to be downloaded saved in the candidate peer are: continuous subblocks after the starting subblock of the data to be downloaded and adjacent to the starting subblock.

The selecting process is as follows:

first, candidate peers are selected in the mode of Step 103;

next, the tracker determines the number of continuous subblocks after the starting subblock of the data to be downloaded and adjacent to the starting subblock according to the location of the starting subblock of the data to be downloaded in the candidate peers;

then, the tracker compares the number of continuous subblocks of the data to be downloaded that is determined with the first threshold, and determines whether the number of continuous subblocks of the data to be downloaded is larger than the first threshold;

here, the first threshold may be determined according to the number of subblocks that need to be uploaded to the request peer continuously by the candidate peer. For example, it requires that the candidate peer can at least continuously upload 3 subblocks to the request peer, then the first threshold may be set as 3; and finally, the tracker selects the candidate peers of which the number of continuous subblocks of the data to be downloaded is larger than the first threshold.

Still referring to FIG. 3, the tracker determines that the starting subblock of the data to be downloaded is subblock t3, then it queries whether there exist continuous subblocks containing subblock t3 in the selectable peers; in FIG. 3, there exits a segment of continuous subblocks containing subblock t3 in the selectable peer, and there further exist 7 continuous subblocks after t3 in the same continuous subblocks. It is hypothesized that the first threshold set in Embodiment 2 is 3, then the selectable peer shown in FIG. 3 can meet the selection condition of Embodiment 2.

If the number of determined candidate peers meeting the selection condition of Embodiment 2 is too large, for example, larger than the maximum value, a part of the peers may be selected therefrom as the peers to be written to the Peerlist, the process for selecting a part of the peers is as follows:

first, the selected candidate peers are ordered from large to small according to the number of continuous subblocks of the data to be downloaded, and then the first N candidate peers are selected, where N is a positive integer and is no larger than the maximum value, so that the number of continuous subblocks of the data to be downloaded of the candidate peers that are selected is larger than that of the candidate peers that are not selected, thus it may guarantee that data as many as possible can be provided to the request peer.

In the solution of Embodiment 2, because the starting subblock of the data to be downloaded is one of a segment of continuous subblocks in the candidate peers and the number of subblocks after the starting subblock of the data to be downloaded is larger in the continuous subblocks, the active peers determined by the request peer can further provide the data to be downloaded to the request peer continually in a time duration, so that the stability of the system may be improved, and the problem may be avoided that the request peer frequently searches active peers because the data that can be provided by the active peers searched by the request peer is limited, and the communication pression may be effectively alleviated.

Embodiment 3

Based on Embodiment 1 or Embodiment 2, Embodiment 3 of the invention further puts forward that: it requires that the total number of subblocks of the data to be downloaded saved in the candidate peers finally selected be larger than a second threshold.

The method according to Embodiment 3 of the invention includes the following steps.

Step 1: A selectable peer reports the total number of the subblocks it buffers to a tracker.

In this embodiment, a selectable peer in the P2P system needs to report the total number of the subblocks it buffers to a tracker periodically or in real time; here, the total number may be the amount of actually buffered subblocks, or it may be the amount of all subblocks after the starting subblock of the data to be downloaded.

This step and Step 101 in Embodiment 1 may be performed at the same time, that is, the selectable peer report the information of continuous subblocks it buffers and the total number of subblocks to the tracker, or it may report a part of the information thereof to the tracker, or it may report the above information at different moments respectively.

Step 2: A request peer accesses to the tracker and sends a Peerlist request to the tracker, where the Peerlist request includes the starting subblock identification of the data to be downloaded by the request peer.

This step is the same as Step 102 in Embodiment 1.

Step 3: The tracker selects a plurality of candidate peers that meet the selection condition from the selectable peers.

The selection condition at least includes that: the starting subblock of the data to be downloaded is buffered in the candidate peer; the number of continuous subblocks after and adjacent to the starting subblock of the data to be downloaded is larger than the first threshold; and the total number of subblocks of the data to be downloaded saved in the candidate peer is larger than the second threshold.

Here, the second threshold may be determined according to the number of subblocks that need to be uploaded to the request peer by the candidate peer, and the larger the second threshold is set, the larger the number of subblocks that can be uploaded to the request peer will be.

The selection mode is as follows:

first, candidate peers are preliminarily determined according to the solution of Embodiment 1 and/or Embodiment 2.

then, the tracker determines the number of all subblocks after the starting subblock of the data to be downloaded according to the location of the starting subblock of the data to be downloaded in the candidate peer preliminarily determined finally, the tracker compares the determined number of all the subblocks with the second threshold, and selects the candidate peers of which the number of subblocks is larger than the second threshold.

Still referring to FIG. 3, in the selectable peer, there are further 11 subblocks buffered after subblock t3; if the second threshold is 10, the selectable peer can meet the selection condition of Embodiment 3, and it may be a candidate peer. In this embodiment, F indicates the total number of the subblocks buffered in the selectable peer; if F occupies 2 bytes, the selectable peer only needs to report F information to the tracker to inform the tracker of the information of the subblocks it buffers.

In Step 3, the process for selecting a candidate peer by utilizing the selection condition of Embodiment 3 may be accomplished via the following two formulae:

$$\text{Offset\_One} \leq \text{Offset\_Zero} \leq \text{Offset\_One} + \text{Counter\_One} \quad (1)$$

$$V = \text{Counter\_One} - (\text{Offset\_Zero} - \text{Offset\_One}) \quad (2)$$

Where formula (1) indicates that the subblock most urgently needed by the request peer lies in a segment of continuous subblocks of the selectable peer, and formula (2) indicates that the amount of subblocks that can be continuously provided to the request peer by the selectable peer is V, wherein, V is equal to or larger than the set first threshold.

If the above formula (1) is true, the tracker may further select selectable peers of which F is larger than the second threshold from the candidate peers determined via the above two formulae; if formula (1) is not true, the tracker may directly select selectable peers of which F is larger than the second threshold.

Step 4: The tracker sends the peer information of the candidate peers selected by the selection condition in Step 3 to the request peer via the Peerlist.

Step 5: The request peer may determine at least one active peer according to the Peerlist received.

If the number of candidate peers meeting the selection condition of Embodiment 3 that are determined is larger than the maximum value, a part of the peers may be selected therefrom as the peers to be written to the Peerlist, and the process for selecting a part of the peers is as follows:

first, the candidate peers selected are ordered from large to small according to the total number of subblocks of the data to be downloaded, and then the first M candidate peers are selected, where M is a positive integer and is no larger than the maximum value, so that the total number of subblocks of the data to be downloaded of the candidate peers that are selected is larger than that of the candidate peers that are not selected, thus it may guarantee that data as many as possible can be provided to the request peer.

In the solution of Embodiment 3, because the total number of subblocks of the data to be downloaded buffered on the candidate peer finally selected is larger, it may further determine based on Embodiment 3 that the candidate peer selected can provide data as many as possible to the request peer, and the number of times the request peer searches active peers may be reduced as much as possible.

Embodiment 4

The information reported by the selectable peer to the tracker may also include the information related to whether the number of connection peers is saturated, thus the tracker may select a candidate peer of which the number of connection peers is unsaturated based on any one of Embodiment 1 to Embodiment 3.

The solution of Embodiment 4 is as follows.

Step 1: A selectable peer reports the information whether the number of its own connection peers is saturated.

This step may be performed with Step 101 of Embodiment 1 and Step 1 of Embodiment 3 at the same time, or they may be performed respectively.

The number of connection peers refers to the number of other peers obtaining data from the selectable peer. That is, when the number of connection peers of the selectable peer is calculated, it considers whether the number of other peers connected is saturated when the selectable peer acts as an active peer, rather than considering the number of other peers connected when the selectable peer downloads data from other peers.

In the solution of Embodiment 4 of the invention, after the selectable peer logs on the tracker, it may periodically notify whether the number of its own connection peers is saturated, and the notification mode includes, but is not limited to, the following two modes.

Mode 1: The selectable peer may periodically report its own connection flag to the tracker, marked as Connection_Flag, and the connection flag indicates whether the selectable peer can also provide data to other peers, that is, whether the number of connection peers is saturated.

If the number of connection peers of a certain selectable peer has reached the maximum number of peers that can be connected, it sets Connection_Flag as "down", which indicates that the number of connection peers of the selectable peer is saturated, and it cannot provide data download to other peers; otherwise, it sets Connection_Flag as "up", which indicates that the number of connection peers of the selectable peer is unsaturated, and it can provide data to other peers. When the tracker determines whether the number of the connection peers of the selectable peer is saturated in this mode, only Connection_Flag of 1 byte needs to be transmitted between the peer and the tracker, thus the network resources occupied will be less.

Mode 2: When the selectable peer accesses to the tracker, it notifies the tracker of the maximum number of peers it can connect. In the subsequent process, the selectable peer periodically reports to the tracker the number of peers it has connected. The tracker determines whether the number of peers the selectable peer has currently connected is less than the maximum number of peers that can be connected by the selectable peer, if yes, it indicates that the number of connection peers of the selectable peer is unsaturated; otherwise, it indicates that the number of connection peers of the selectable peer is saturated.

Step 2: A request peer accesses to the tracker and sends a Peerlist request to the tracker, where the Peerlist request includes the starting subblock identification of the data to be downloaded by the request peer.

This step is the same as Step 102.

Step 3: The tracker selects a plurality of candidate peers that meet the selection condition from the peers determined.

An additional selection condition may be added to the selection condition based on any one of Embodiment 1 to Embodiment 3: the number of connection peers of the candidate peer is unsaturated.

Step 4: The tracker returns the peer information of the candidate peers selected to the request peer via the Peerlist.

Because in Step 3, the tracker screens the peers accessed to according to the condition whether the number of connection peers is saturated, in this step, all the candidate peers corresponding to the peer information in the Peerlist have the capability of being connected with the request peer.

If the number of candidate peers selected by the tracker according to the selection condition of Step 3 is larger than the maximum value, the candidate peers selected will be further screened, so as to guarantee that the number of candidate peers further screened is no larger than the maximum value; for example, the number of candidate peers further screened may be made equal to the maximum value.

Step 5: After the request peer receives the Peerlist, it determines at least one candidate peer as an active peer according to the peer information in the Peerlist.

In this step, the request peer can determine at least one active peer that can provide the data needed by the request peer, without the need to send sounding information for determining whether it has a connection capability to each candidate peer in the Peerlist.

By the solution of Embodiment 4 of the invention, because the tracker screens the selectable peers in the system according to the condition whether the number of connection peers is saturated, the candidate peers selected have the capability to connect to other peers, thus the utilization of the tracker may be improved, and a Peerlist with higher accuracy may be provided to the request peer; furthermore, because the request peer does not need to query from the candidate peers whether they have the capability to connect to other peers, the amount of information interaction between the request peer and the candidate peers may be reduced, and the bandwidth consumption of the network may be lowered.

By the solutions of Embodiment 1 to Embodiment 4 of the invention, because the tracker screens the selectable peers in the system according to the condition that the number of connection peers of the candidate peer is unsaturated, and makes the candidate peer selected be able to connect with the request peer, and because in the solution of any one of Embodiment 1 to Embodiment 3, it requires that the subblock most urgently needed by the request peer be buffered on the candidate peers, all the candidate peers may act as active peers of the request peer, thus the steps of interacting information between the request peer and the peers corresponding to the peer information in the Peerlist and determining the active peers by interchanging bitmaps may be omitted, and the amount of information transmission may be greatly reduced, so that the existing mode in which active peers are determined in two steps can be modified into one-step determination mode, and the complicated operations at the peer side may be simplified.

In the solution of Embodiment 1 to Embodiment 4 of the invention, each selectable peer may periodically report to the tracker the information after it simplifies and processes bitmap, where such information includes, but is not limited to, one or a combination of Connection_Flag, offset_one of Bitmap, Counter_One and the number F of bits with identification "1" in Bitmap. The tracker determines the state of the buffered subblocks in each selectable peer according to the information received, thereby selecting suitable candidate peers according to the selection conditions concerned in Embodiment 1 to Embodiment 4.

In the embodiments of the invention, the bytes occupied by such information are not limited, for example, it may be set that: Connection_Flag occupies 1 byte, offset of Bitmap occupies 4 bytes, Counter_One occupies 2 bytes and F occupies 2 bytes.

Embodiments of the invention relate to the following four selection conditions for selecting candidate peers respectively.

1) The number of connection peers of the candidate peer is unsaturated, where the number of connection peers is the number of other peers that obtain data from the candidate peer.

2) The starting subblock of the data to be downloaded contained in the Peerlist request is buffered in the candidate peer.

3) The number of continuous subblocks of the data to be downloaded saved in the candidate peer is larger than the first threshold.

Furthermore, when the starting subblock of the data to be downloaded contained in the Peerlist request is buffered in the candidate peer, the continuous subblocks of the data to be downloaded saved in the candidate peer are continuous subblocks after the starting subblock of the data to be downloaded and adjacent to the starting subblock.

4) The total number of subblocks of the data to be downloaded saved in the candidate peer is larger than a second threshold.

Furthermore, when the starting subblock of the data to be downloaded contained in the Peerlist request is buffered in the candidate peer, the subblocks of the data to be downloaded saved in the candidate peer are subblocks after the starting subblock of the data to be downloaded.

In Embodiment 1, candidate peers are selected according to selection condition 2; in Embodiment 2, candidate peers are selected according to selection conditions 2 and 3; in Embodiment 3, candidate peers are selected according to selection conditions 2, 3 and 4; and in Embodiment 4, candidate peers are selected according to selection conditions 1, 2, 3 and 4. In addition to the solutions disclosed in Embodiment 1 to Embodiment 4 of the invention, it is not limited to selecting candidate peers only according to selection condition 3, selecting candidate peers only according to selection condition 4 or selecting candidate peers only according to selection condition 1, and selecting candidate peers in other modes in which the above 4 selection conditions are combined.

For example, candidate peers are selected according to selection conditions 1 and 3: the tracker further selects at least one candidate peer that meets selection condition 3 from the candidate peers that meet selection condition 1, where selection condition 3 is that the number of continuous subblocks of the data to be downloaded saved in the candidate peer is larger than the first threshold. Here, the continuous subblocks of the data to be downloaded saved in the candidate peer may or may not contain the starting subblock of the data to be downloaded.

Candidate peers are selected according to selection conditions 1 and 4: the tracker further selects at least one candidate peer that meets selection condition 4 from the candidate peers that meet selection condition 1, where selection condition 4 is that the total number of subblocks of the data to be downloaded saved in the candidate peer is larger than a second threshold. Here, the subblocks of the data to be downloaded saved in the candidate peer may contain the starting subblock of the data to be downloaded (i.e., the solutions of Embodiments 2, 3 and 4), or it may not contain the starting subblock of the data to be downloaded; if no starting subblock of the data to be downloaded is contained, the subblocks of the data to be downloaded saved in the candidate peer refers to the overall subblocks of the candidate peer, rather than particularly referring to the subblocks after the starting subblock of the data to be downloaded.

Candidate peers are selected according to selection conditions 1, 2 and 4: when the number of candidate peers that meet selection conditions 1 and 2 is larger than 1, the tracker further selects at least one candidate peer that meets selection condition 4 therefrom, where selection condition 4 is that the total number of subblocks of the data to be downloaded saved in the candidate peer is larger than a second threshold. Furthermore, the subblocks of the data to be downloaded saved in the candidate peer are subblocks after the starting subblock of the data to be downloaded.

Candidate peers are selected according to selection conditions 1, 3 and 4: when the number of candidate peers that meet selection conditions 1 and 3 is larger than 1, the tracker further selects at least one candidate peer that meets selection condition 4 therefrom, where selection condition 4 is that: the total number of subblocks of the data to be downloaded saved in the candidate peer is larger than a second threshold. The subblocks of the data to be downloaded saved in the candidate peer may contain the starting subblock of the data to be downloaded (i.e., the solution of Embodiment 4), or it may not contain the starting subblock of the data to be downloaded; if no starting subblock of the data to be downloaded is contained, the subblocks of the data to be downloaded saved in the candidate peer refers to the overall subblocks of the candidate peer, rather than particularly referring to the subblocks after the starting subblock of the data to be downloaded.

After the request peer determines the active peers, it may download the data needed from the active peers. After the active peers determined expire, the request peer will again send a Peerlist request to the tracker to obtain a new Peerlist.

In one embodiment of the invention, after the tracker receives a Peerlist request sent by the request peer, it may select the peers of which the physical addresses are adjacent to the request peer (for example, in the same province or in the same country, or peers with a geographic location difference smaller than a fixed value) in advance according to the IP addresses of the peers, and then further selects the candidate peers therefrom according to the selection conditions of the embodiments of the invention.

By the solutions provided in Embodiment 1 to Embodiment 4 of the invention, each selectable peer briefly and efficiently reports its own subblock information to the tracker, for example, the number of continuous subblocks buffered, the sequence number of the first subblock of the continuous subblocks and the total number of the subblocks buffered, so that the tracker can verify the state of the current buffered subblocks and the number of other peers connected of each selectable peer in real time, when a request peer requests to obtain a Peerlist, the tracker may select, as practically required, the peers meeting a condition from the selectable peers as candidate peers according to the condition of the buffered subblocks and the number of connection peers, so as to guarantee that the candidate peers selected can correctly upload data to the request peer; thus, when the request peer determines the active peers, it may modify the original process in which active peers are searched in two steps into one-step search, so that the messages generated when a request peer searches the active peers via a Peerlist may be eliminated, the network pression may be alleviated, and the bandwidth consumption may be reduced; it is hypothesized that in the prior art, each peer may search an active peer by querying 10 peers in average, then in a P2P system with 1 million peers, the number of messages thus added will be 10 millions. However, in the solution of the invention, messages of this part are cancelled, thus the bandwidth pression of the network will be alleviated apparently. Additionally, the peer information reported by each peer is processed by the tracker unitedly, so that the utilization of the tracker may be improved.

Embodiment 5

Figure 4:
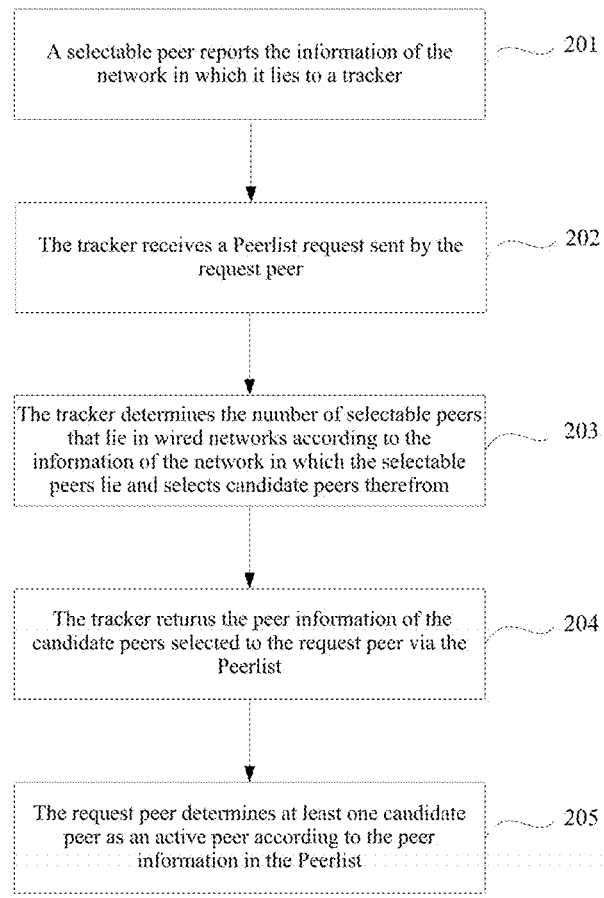
FIG. 4 is a schematic diagram of a method for searching an active peer according to Embodiment 5 of the invention.

As shown in FIG. 4, it is a schematic diagram of a method for searching an active peer in a P2P streaming media system according to Embodiment 5 of the invention, where the method includes the following steps.

Step 201: A selectable peer reports the information of the network in which it lies to a tracker.

In this embodiment, the selectable peer may report its own related information to the tracker when it logs on the tracker, for example, IP address, port number and the information of the network in which it lies. In order to make the tracker learn the network in which the selectable peer lies, the selectable peer may directly report the identification of the network in which it lies, or it may report the parameters related to the character of the networks in which it lies, and the tracker determines the network in which the selectable peer lies according to the related parameters.

The wired network concerned in embodiments of the invention includes, but is not limited to networks accessed via optical cables and network cables, etc.; and the wireless network includes, but is not limited to, wireless local area network (WLAN) and mobile interconnecting network (including equivalent networks such as General Packet Radio Service (GPRS) network, EDGE network, 3G network, Wireless Fidelity (WIFI) network and Long Term Evolution (LTE) network).

Step 202: The tracker receives a Peerlist request sent by the request peer.

The Peerlist request may carry related information of the request peer, for example, the IP address, port number and the information of the network in which the request peer lies.

Step 203: The tracker determines the number of selectable peers that lie in wired networks according to the information of the networks in which the selectable peers lie, and different modes for selecting candidate peers are employed when the number of selectable peers that lie in wired networks is different.

If the number of selectable peers that lie in wired networks is no less than the number of candidate peers required, the tracker selects the candidate peers from the selectable peers that lie in wired networks; if the number of selectable peers that lie in wired networks is less than the number of peers needed, the tracker takes all the selectable peers that lie in wired networks and at least one selectable peer that lies in a wireless network as the candidate peers. The number of candidate peers selected may just be equal to the number of candidate peers required, if the conditions of the selectable peers are good, the number of candidate peers actually selected may be larger than the number of candidate peers required; and if the conditions of the selectable peers are poor, the number of candidate peers actually selected may be less than the number of candidate peers required.

Furthermore, if there exists no selectable peers that lie in wired networks in the P2P system, the tracker selects the candidate peers directly from the selectable peers in the wireless network.

Step 204: The tracker returns the peer information of the candidate peers selected to the request peer via the Peerlist.

In Step 203, the tracker screens the peers according to the character of the networks in which the peers lie, thus all the peers corresponding to the peer information in the Peerlist are peers with a high data transmission speed.

In order to guarantee the reasonableness of the number of candidate peers selected by the tracker, which can not only make the request peer correctly search the active peer according to the Peerlist, but also avoid excessive bandwidth consumption due to redundant number of candidate peers, it may be determined according to the actual condition of the current network or the empirical value that the number of candidate peers required is a given value. If the number of candidate peers meeting the selection condition of Step 203 is larger than the given value, the candidate peers selected may be further selected, so as to guarantee that the number of candidate peers further selected is no larger than the given value.

Step 205: The request peer determines at least one candidate peer as an active peer according to the peer information in the Peerlist.

By the solution of Embodiment 5 of the invention, it adds a function that the tracker determines the character of the networks in which the peers lie; the tracker preferably selects the peers that lie in wired networks as candidate peers, because under normal situations, the data transmission speed of a peer in a wired network is higher than that of a peer in a wireless network; therefore, the active peers determined finally can upload data to the request peer at a transmission speed as high as possible, thereby improving the transmission speed of the whole P2P system and lowering the waiting delay of the request peer.

The embodiment of the invention further considers the capability of the selectable peer itself, and takes the battery continuation capability, computing capability, storage space size and memory size of the selectable peer as the conditions for selecting candidate peers.

Embodiment 6

In Embodiment 6, based on Embodiment 5, if the candidate peers determined are peers that lie in wireless networks and the candidate peers need to be supplied by batteries, the battery continuation time may be taken as a condition for selecting candidate peers, and selectable peers with a long battery continuation time will be selected as much as possible.

If the selectable peers are peers that lie in wireless networks, the battery continuation capability of the selectable peers will be taken as a condition for selecting candidate peers, and candidate peers with a strong battery continuation capability will be selected therefrom.

The solution of Embodiment 6 is as follows.

First, when the selectable peer lies in a wireless network, the selectable peer reports the battery continuation time to the tracker.

The battery continuation time during normal use depends on the related applications executed. For example, if the selectable peer uses streaming media in a certain period of time, the battery consumption speed when using streaming media may be calculated according to the electric quantity consumed by the peer in said period of time. Each time when the peer uses streaming media, it will record the current battery consumption speed, and calculate the average value of these values. The weight obtained by dividing the electric quantity of the battery by the battery consumption speed obtained may be regarded as a representation of battery continuation capability. That is, the battery continuation time may be determined according to the power consumption of the application executed by the selectable peer and the electric quantity of the battery itself.

Then, based on the candidate peers determined according to the solution of Embodiment 5, the tracker further screens the candidate peers of which the battery continuation time is larger than a first time length, and returns the peer information of the candidate peers further screened to the request peer via the Peerlist.

The first time length in this embodiment may be determined according to an empirical value, or determined according to the battery continuation capability needed by the candidate peer.

By the solution of Embodiment 6 of the invention, it may guarantee that the battery continuation capability of the candidate peers selected is strong, thereby avoiding the problem of data transmission interruption caused by power failure.

Embodiment 7

When the selectable peer reports its own data processing speed to the tracker periodically or when the selectable peer logs on the tracker, after determining the candidate peers according to any solution of Embodiment 5 or Embodiment 6, the tracker may further screen candidate peers with a data processing speed higher than a given speed, and return the peer information of the candidate peers further screened to the request peer via the Peerlist.

In this embodiment, the given speed may be set according to the current network condition and the transmission speed needed during the data transmission process, for example, a high speed is set when the network condition is good and the transmission speed requirement is high, and a low speed is set when the network condition is poor and the transmission speed requirement is low.

Similar to the solution of Embodiment 5, if the number of candidate peers that meet the selection condition of Embodiment 7 is larger than the maximum value, the candidate peers may be ordered from large to small according to the data processing speed, and then the first A candidate peers is selected therefrom, where A is a positive integer that is no larger than the maximum value.

Embodiment 8

The selectable peer may report its own storage space size and memory size to the tracker, and when the tracker selects candidate peers for the request peer, it may further screen candidate peers with a storage space larger than a first numerical value and with a memory larger than a second numerical value from the candidate peers obtained in any one of Embodiment 5 to Embodiment 7, so as to guarantee that the candidate peers further screened are peers with strong capability.

The first numerical value and the second numerical value in this embodiment may be determined according to an empirical value, so that the candidate peers screened can buffer data to be uploaded to the request peer as many as possible.

Because the available storage space size and memory size of the selectable peer may be changed at any moment, the selectable peer may also periodically report its own storage space size and memory size to the tracker.

Based on Embodiment 5, in the solutions of Embodiment 6 to Embodiment 8, the capability of the selectable peer itself is also taken as a condition for selecting candidate peers, so that candidate peers with a high data processing speed, a large storage space and a large memory may be selected; furthermore, when the candidate peers selected are peers that lie in wireless networks, because the candidate peers are screened according to the battery continuation capability thereof, it may guarantee that the battery continuation capability of the candidate peers is strong enough to meet the data transmission requirements.

Embodiment 9

With further researches based on any one of Embodiment 5 to Embodiment 8, Embodiment 9 of the invention finds that, if peers with high liveness are further selected as the candidate peers, it may well guarantee a high stability of the active peers determined finally; thus, in Embodiment 9, the selection condition for selecting candidate peers further includes: peers of which the on-line time length is larger than a second time length, where the on-line time length is the time length from the moment the peer lately logs on the tracker to the current moment.

Here, the second time length may be set according to an empirical value or according to the current stability requirements on the candidate peer; the higher the stability requirements on the candidate peer is, the longer the second time length will be set.

In the solution of Embodiment 9, the selectable peer needs to report its own on-line time length to the tracker, and the reporting occasion may be at the same time as Step 201 is performed, or it may be reported before the tracker selects selectable peers according to the on-line time length of the selectable peers.

Figure 5:
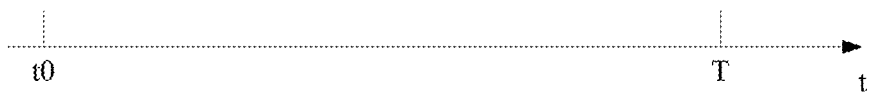
FIG. 5 (a) and FIG. 5 (b) are schematic diagrams of an on-line time duration of a selectable peer according to Embodiment 9 of the invention.
Figure 5:

As shown in FIG. 5 (*a*) and FIG. 5 (*b*), they are schematic diagrams of the on-line time length of a certain selectable peer according to Embodiment 9 of the invention. In FIG. 5 (*a*), a peer logs on a tracker at moment t0; if the current moment is T and the peer is in tracker log-on state from moment t0 to T, it will be considered that the on-line time length of the peer is a time length of t0–T. In FIG. 5 (*b*), a peer logs on a tracker at moment t0, but it logs off the tracker at moment t1 and again logs on the tracker at moment t2, and the current moment is T; because the peer is in tracker log-on state from moment t2 to T, it will be considered that the on-line time length of the peer is time length t2–T.

There exist many modes for the selectable peer to report the on-line time length to the tracker, which includes, but is not limited to, the following two modes:

1) the peer records the logon time when it logs on the tracker, and periodically reports the current on-line time length to the tracker. If the peer logs off the tracker, it notifies the tracker to delete the on-line time length reported previously, thus it may guarantee that the on-line time length recorded in the tracker is the on-line time length of a peer in on-line state. When the tracker needs to determine the on-line time length of the peer, it may directly determine the on-line time length of the peer according to the on-line time length recorded; and 2) when the peer logs on the tracker, the tracker records the logon time. When the peer logs off the tracker, the tracker may delete the logon time or make the logon time recorded in an unactivated state, and when the peer again logs on the tracker, if the tracker has deleted the logon time, it rerecord the current logon time; if the tracker makes the logon time recorded last time in an unactivated state, the tracker reactivates the logon time and updates the logon time recorded to the current logon time. When the tracker needs to determine the on-line time length of the peer, it can easily determine the on-line time length of the peer according to the logon time of the peer and the current time.

After the tracker selects the candidate peers according to the information of the networks in which the selectable peers lie, it may further screen, from the candidate peers, candidate peers of which the time length from the moment the peers lately log on the tracker to the current moment is larger than a second time length, and take the candidate peer further screened as the candidate peers that are returned to the request peer via the Peerlist.

If the number of peers that meet the selection condition of Embodiment 9 is larger, for example, if the number of peers is larger than a given value, the peers that meet the selection condition will be further screened, and the screening method is as follows:

first, ordering the peers that meet the selection condition from large to small according to the on-line time length; and then, selecting the first B peers therefrom, where B is a positive integer that is no larger than the given value, and the B peers selected are candidate peers.

In Embodiment 9, the peers are selected by taking the character of the networks in which the peers lie and the on-line time length as selection conditions, thus the candidate peers obtained have a high data transmission speed; and, because the on-line time length of the candidate peers is larger, which indicates that the candidate peers are stable peers in the P2P system; therefore, after such peers become active peers, they can steadily provide data to the request peer, thereby avoiding the problem that the request peer often needs to redetermine the active peers because the active peers selected is unstable (for example, the active peers frequently log on or log off the tracker).

Embodiment 10

Based on any one of Embodiment 5 to Embodiment 9, the solution of Embodiment 10 of the invention may select the selectable peers with a high data upload efficiency as candidate peers. In the solution of Embodiment 10 of the invention, before the tracker selects candidate peers for the request peer, it further includes a step in which the selectable peer reports the data upload efficiency to the tracker.

The data upload efficiency of the selectable peer may be determined in the following mode:

first, it determines the on-line time length of the selectable peer and the data volume of the data uploaded by the selectable peer in the on-line time length. The data volume of the data uploaded refers to: the data volume of the data provided by the selectable peer as an active peer to other peers. Then, the data volume of the data uploaded is divided by the on-line time length, and the quotient obtained is taken as the data upload efficiency of the candidate peer.

The selectable peer periodically sends the data upload efficiency calculated to the tracker, or it may periodically report the on-line time length and the data volume of the data uploaded by the selectable peer in the on-line time length, and the tracker may calculate the data upload efficiency of the selectable peer according to the on-line time length and the data volume of the data uploaded by the selectable peer in the on-line time length that are received.

The step in which selectable peer reports the data upload efficiency to the tracker may be performed with Step 201 in Embodiment 5 at the same time.

If Embodiment 10 of the invention is a solution based on Embodiment 5, the selection condition that limits the selection of candidate peers includes: peers that lie in wired networks and peers with a data upload efficiency larger than a given efficiency value are preferably selected. In this situation, after the tracker selects the candidate peers according to the information of the network in which the selectable peer lies, it may further screen candidate peers with a data upload efficiency larger than a given efficiency value from the candidate peers, and take the candidate peers further screened as the candidate peers that are returned to the request peer via the Peerlist.

The given efficiency value may be determined according to an empirical value or according to the requirements on the data upload capability of the candidate peers, where the higher the requirements on the data upload capability of the candidate peers are, the larger the given efficiency value will be.

If Embodiment 10 of the invention is a solution based on Embodiment 9, the selection condition that limits the selection of candidate peers includes: peers that lie in wired networks, peers with a on-line time length larger than a second time length and peers with a data upload efficiency larger than a given efficiency value are preferably selected. In this situation, the tracker may further screen candidate peers with a data upload efficiency larger than a given efficiency value from the candidate peers determined in Embodiment 9, and take the candidate peer further screened as the candidate peers that are returned to the request peer via the Peerlist.

If the number of peers that meet the selection condition of Embodiment 10 is larger, for example, if the number of peers is larger than a given value, the tracker may further screen the peers that meet the selection condition, and the screening method is as follows:

first, the tracker orders the peers that meet the selection condition from high to low according to the data upload efficiency; and then, the tracker selects the first C peers therefrom, where C is a positive integer that is no larger than the given value, and the C peers selected are candidate peers.

When a part of the peers are screened from the peers that meet the selection condition of Embodiment 10, it may consider the data upload efficiency and the on-line time length, for example, a suitable number of candidate peers may be selected in the weighting mode of formula (3):

$$X = a*Y + bZ \qquad (3)$$

where a and b are weighting factors, and a+b=1; Y is data upload efficiency; Z is on-line time length. After calculating via formula (3), B peers with maximum X are selected as candidate peers.

In the solution of Embodiment 10, peers with a high data transmission speed are selected according to the character of the networks in which the peers lie, stable peers are selected according to the on-line time length; moreover, the data volume uploaded by the selected peers in unit time is further considered, the larger the data volume uploaded in unit time is, the stronger the capability of the peer to upload data to other peers will be, that is, the higher the robustness will be. Thus, the active peers finally selected can provide data to the request peer steadily, rapidly and abundantly, thereby improving the data transmission efficiency of the P2P system.

Embodiment 11

The solution of Embodiment 11 of the invention is based on Embodiment 10, and the selection condition that limits the selection of candidate peers includes: peers that lie in wired networks, peers with a on-line time length larger than a second time length, peers with a data upload efficiency larger than a given efficiency value and peers of which the network has a network bandwidth larger than a given bandwidth value are preferably selected.

The given bandwidth value may be determined according to the minimum bandwidth value that can be used for transmitting upload data.

In the solution of Embodiment 11 of the invention, before the tracker selects candidate peers for the request peer, it may further include a step in which the selectable peer reports the network bandwidth of the network the selectable peer lies in to the tracker.

The network bandwidth of the network in which the selectable peer lies may be determined in the following mode:

when the selectable peer uploads data to the connection peer, it may simultaneously measure the outgoing bandwidth of the selectable peer, and take the outgoing bandwidth as the network bandwidth of the selectable peer; or, it may determine the data volume of the data uploaded to the connection peer by the selectable peer in a certain time, calculate the outgoing bandwidth of the selectable peer according to the data volume transmitted in unit time, and take the outgoing bandwidth determined as the network bandwidth of the selectable peer.

The selectable peer may periodically report the network bandwidth of the network the selectable peer lies in to the tracker, or it may report the data volume transmitted in unit time to the tracker, and the tracker may determine the network bandwidth of the network in which the selectable peer lies. The occasion the network bandwidth of the network in which the selectable peer lies is reported may be the same time as that of Step 201.

When the number of peers that meet the selection condition of Embodiment 11 is larger, D peers with the largest network bandwidth may be selected therefrom as the candidate peers. For example, the peers that meet the selection condition of Embodiment 11 are ordered from large to small according to the network bandwidth of the network in which the peers lie, and the first D peers are selected as candidate peers, where D is a positive integer that is no larger than the given value. Similar to Embodiment 10, in Embodiment 11 of the invention, the on-line time length, the data upload efficiency and the network bandwidth may be weighted and summarized, and the peers with the best comprehensive quality may be selected as the candidate peers.

The solution in Embodiment 11 of the invention may also be a preferred solution based on any one of Embodiment 5 to Embodiment 10.

In the solution of Embodiment 11, the character of the network in which the peer lies, the network bandwidth, the data transmission capability of the peer itself and the link state are considered comprehensively, so that the active peers determined finally can serve the request peer as well as possible; based on Embodiment 5 to Embodiment 11, the transmission capability of the network in which the active peer lies is made to meet the requirements of P2P service transmission, thus it may avoid the problem that the other services of the active peer are affected because the P2P service occupies too much bandwidth.

In the solutions of Embodiment 5 to Embodiment 11, the selection condition concerned includes:

a) if the selectable peer lies in a wireless network, the battery continuation time is larger than a first time length;

b) the data processing speed of the selectable peer is larger than a given speed;

c) the storage space size of the selectable peer is larger than a first numerical value, and the memory size is larger than a second numerical value;

d) the peers that lie in wired networks are preferably selected;

e) the peers of which the time length from the moment the peers lately log on the tracker to the current moment is larger than a second time length;

f) the peers with a data upload efficiency larger than a given efficiency value; and g) the peers of which the network has a network bandwidth larger than a given bandwidth value.

By the solutions provided in Embodiment 5 to Embodiment 11 of the invention, the tracker learns, in advance, the character of the networks in which peers lie, preferably selects the peers with a high transmission speed, optimizes the data transmission performance between peers that belong to the same or different autonomous systems on Mobile Internet and improves the data transmission speed between peers; furthermore, it takes the on-line time length, the data upload efficiency and the network bandwidth as selection conditions for selecting candidate peers, and the candidate peers selected are peers with a high robustness and a good stability, so that the connection establishment speed between peers will be higher, and the time delay for data transmission will be lowered. Furthermore, the capability of the selectable peer itself is also taken as a condition for selecting candidate peers, thus it may guarantee a high data transmission speed of the candidate peer, a large storage space and a good battery continuation capability, so that the active peers determined from the candidate peers can better upload data to the request peer. Finally, by the solution of the invention, the request peer only needs to send one Peerlist request before it finds an active peer, thus the play starting time will be shortened.

By the solutions disclosed in Embodiment 1 to Embodiment 11 of the invention, the tracker may search the active peers according to the four selection conditions concerned in Embodiment 1 to Embodiment 4, or it may search the active peers according to the seven selection conditions concerned in Embodiment 5 to Embodiment 11, or it may search the active peers by taking one or more of the eleven selection conditions concerned in Embodiment 1 to Embodiment 11 as the selection condition.

When the active peers are searched by using any one of the eleven selection conditions concerned in Embodiment 1 to Embodiment 11, the active peers may be searched according to the mode disclosed in Embodiment 1 to Embodiment 11 on the basis of the actually selected condition.

For example, if the selection condition for searching the active peers is that: the starting subblock of the data to be downloaded contained in the Peerlist request is buffered in the candidate peer, the number of connection peers of the candidate peer is unsaturated, the number of continuous subblocks of the data to be downloaded saved in the candidate peer is larger than the first threshold, the total number of subblocks of the data to be downloaded saved in the candidate peer is larger than a second threshold and the peers that lie in wired networks are preferably selected; the final candidate peers may be obtained in conjunction with the modes for selecting active peers by using the selection conditions that are disclosed in Embodiment 1 to Embodiment 5.

It should be noted that, in the solutions of Embodiment 1 to Embodiment 4, the information reported by the selectable peer to the tracker includes one or more of: the number of continuous subblocks buffered by a selectable peer, the sequence number of the first subblock of the continuous subblocks, the total number of the subblocks buffered by the selectable peer itself, and the related information of whether the number of connection peers of the selectable peer is saturated; in the solutions of Embodiment 5 to Embodiment 11, the information reported by the selectable peer to the tracker includes one or more of: the information of the network in which the selectable peer lies, the battery continuation time of the selectable peer, the data processing speed of the selectable peer, the storage space size and the memory size of the selectable peer, the on-line time length of the selectable peer, the data upload efficiency of the selectable peer and the network bandwidth of the network in which the selectable peer lies; in the solution of this embodiment, the selectable peer is not limited to report to the tracker all or a part of the information reported in Embodiment 1 to Embodiment 11.

The tracker selects the suitable selection condition for selecting candidate peers according to the information actually reported by the selectable peer. For example, if the selectable peer reports the number of continuous subblocks buffered by the selectable peer, the sequence number of the first subblock of the continuous subblocks, the total number of the subblocks buffered by the selectable peer itself, the related information of whether the number of connection peers of the selectable peer is saturated and the information of the network in which the selectable peer lies, at least one selection condition may be selected from the following 5 selection conditions:

the starting subblock of the data to be downloaded contained in the Peerlist request is buffered in the candidate peer;

the number of connection peers of the candidate peer is unsaturated;

the number of continuous subblocks of the data to be downloaded saved in the candidate peer is larger than the first threshold;

the total number of subblocks of the data to be downloaded saved in the candidate peer is larger than the second threshold; and the candidate peer of which the network is a wired network is preferably selected.

The selectable peer may report the above information to the tracker at the same time; or it may select different moments for sending the information according to different information, but the moment for reporting the above information must be earlier than the moment the tracker selects a candidate peer according to the selection condition.

Embodiment 12

Figure 6:
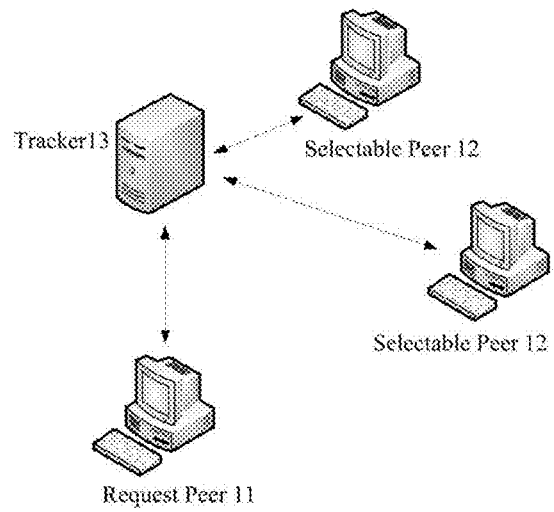
FIG. 6 is a structural representation of a system for searching an active peer according to Embodiment 12 of the invention.

Based on the same inventive conception as Embodiment 1 to Embodiment 4 of the invention, Embodiment 12 of the invention provides a system for searching an active peer in a P2P streaming media system; as shown in FIG. 6, the system includes a request peer 11, a selectable peer 12 and a tracker 13.

The request peer 11 is configured to send a Peerlist request to the tracker 13 and determine at least one candidate peer as an active peer according to the peer information in the Peerlist returned by the tracker 13; the selectable peer 12 is configured to report the number of continuous subblocks buffered and the sequence number of the first subblock of the continuous subblocks to the tracker 13; the tracker 13 is configured to select a plurality of selectable peers 12 as candidate peers according to the sequence number of a starting subblock of data to be downloaded by the request peer which is contained in the Peerlist request after receiving the Peerlist request, where the candidate peers buffer the starting subblock of the data to be downloaded, and return the peer information of the candidate peers selected to the request peer 11 via the Peerlist.

The tracker 13 is further configured to further screen candidate peers of which the number of continuous subblocks buffered is larger than the first threshold from the candidate peers, and return the peer information of the candidate peers further screened to the request peer 11 via the Peerlist, where the continuous subblocks refers to continuous subblocks after the starting subblock of the data to be downloaded and adjacent to the starting subblock.

The selectable peer 12 is further configured to report the information of the total number of the subblocks buffered to the tracker 13; then, the tracker 13 is further configured to further screen candidate peers of which the total number of the subblocks buffered is larger than the second threshold from the candidate peers, and return the peer information of the candidate peers further screened to the request peer 11 via the Peerlist, where the subblocks buffered in the candidate peer further screened refer to: all subblocks after the starting subblock of the data to be downloaded.

The selectable peer 12 is further configured to report the information of whether the number of connection peers is saturated, or the number of the peers that have been connected and the maximum number of peers that can be connected, where the number of connection peers refers to: the number of other peers obtaining data from the selectable peer; then, the tracker 13 is further configured to further screen candidate peers of which the number of connection peers is unsaturated from the candidate peers and return the peer information of the candidate peers further screened to the request peer 11 via the Peerlist.

The tracker 13 is further configured to reselect the candidate peers selected when the number of candidate peers is larger than a maximum value, and return the peer information of the candidate peers reselected to the request peer 11 via the Peerlist, where the number of candidate peers reselected is no larger than the maximum value.

When the selection condition includes that the number of continuous subblocks buffered is larger than a first threshold, the tracker 13 is further configured to order the candidate peers from large to small according to the number of continuous subblocks of the data to be downloaded when the number of candidate peers further screened is larger than the maximum value, reselect the first N candidate peers, and return the peer information of the N candidate peers reselected to the request peer 11 via the Peerlist, where N is a positive integer and is no larger than the maximum value.

When the selection condition further includes that the total number of subblocks of the data to be downloaded saved in the candidate peer is larger than a second threshold, the tracker 13 is further configured to, when the number of candidate peers selected is larger than the maximum value, order the candidate peers selected from large to small according to the total number of subblocks of the data to be downloaded, reselect the first M candidate peers, and return the peer information of the M candidate peers reselected to the request peer 11 via the Peerlist, where M is a positive integer and is no larger than the maximum value.

Embodiment 13

Figure 7:
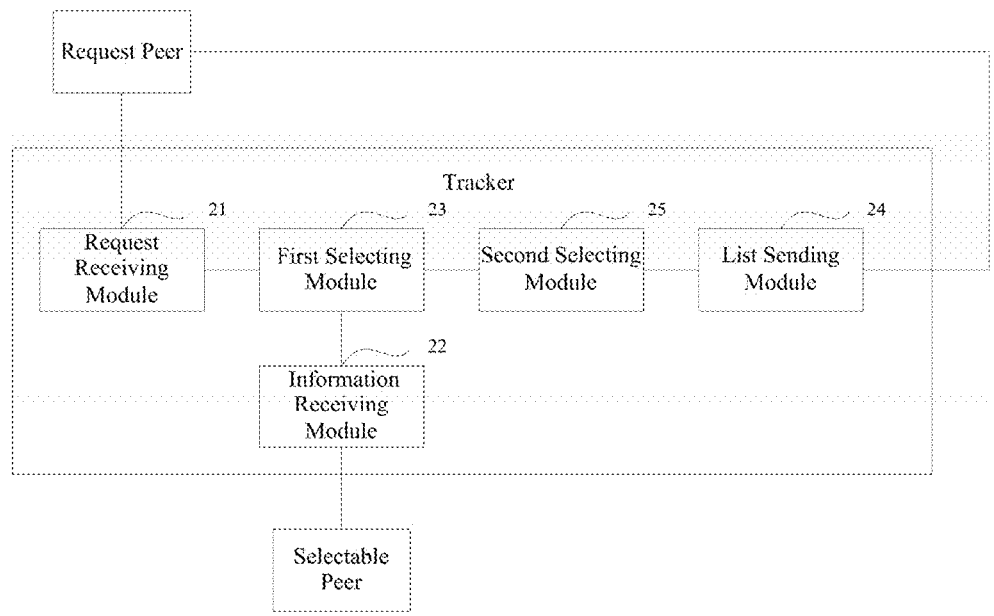
FIG. 7 is a structural representation of a tracker according to Embodiment 13 of the invention.

Embodiment 13 of the invention further provides a tracker based on the same inventive conception as Embodiment 1 to Embodiment 4, which is applicable to a P2P streaming media system; as shown in FIG. 7, the tracker includes a request receiving module 21, an information receiving module 22, a first selecting module 23 and a list sending module 24, where the request receiving module 21 is configured to receive a Peerlist request, where the Peerlist request contains the sequence number of the starting subblock of the data to be downloaded by the request peer; the information receiving module 22 is configured to receive the number of continuous subblocks buffered and the sequence number of the first subblock of the continuous subblocks that are reported by the selectable peer; the first selecting module 23 is configured to select a plurality of selectable peers as candidate peers according to the sequence number of the starting subblock of the data to be downloaded, where the candidate peers buffer the starting subblock of the data to be downloaded; and the list sending module 24 is configured to return the peer information of the candidate peers selected to the request peer via the Peerlist.

The first selecting module 23 may further be configured to further screen candidate peers of which the number of continuous subblocks buffered is larger than the first threshold from the candidate peers, where the continuous subblocks refers to: continuous subblocks after the starting subblock of the data to be downloaded and adjacent to the starting subblock.

The information receiving module 22 is further configured to receive the total number of the buffered subblocks that is reported by the selectable peer; then, the first selecting module 23 is further configured to further screen candidate peers of which the total number of the subblocks buffered is larger than the second threshold from the candidate peers, where the subblocks buffered in the candidate peer further screened refer to: all subblocks after the starting subblock of the data to be downloaded.

The information receiving module 22 is further configured to receive the information of whether the number of the connection peers is saturated, or the number of the peers that have been connected and the maximum number of peers that can be connected that are reported by the selectable peer, where the number of connection peers refers to: the number of other peers obtaining data from the selectable peer; then, the first selecting module 23 is further configured to further screen candidate peers of which the number of connection peers is unsaturated from the candidate peers.

The tracker further includes a second selecting module 25, which has different functions when the selection conditions are different.

When the selection condition is that the number of connection peers of the candidate peer is unsaturated or the starting subblock of the data to be downloaded is buffered, the second selecting module 25 is configured to, when the number of candidate peers selected by the first selecting module 23 is larger than the maximum value, reselect the candidate peers selected and send the peer information corresponding to the candidate peers reselected to the list sending module 24, where the number of candidate peers reselected is no larger than the maximum value.

When the selection condition at least includes that the number of continuous subblocks of the data to be downloaded saved in the candidate peer is larger than a first threshold, the second selecting module 25 is configured to, when the number of candidate peers selected by the first selecting module 23 is larger than the maximum value, order the candidate peers selected from large to small according to the number of continuous subblocks buffered, reselect the first N candidate peers, and send the peer information corresponding to the N candidate peers reselected to the list sending module 24, where N is a positive integer and is no larger than the maximum value. Here, the continuous subblocks of the data to be downloaded refer to: continuous subblocks after the starting subblock of the data to be downloaded and adjacent to the starting subblock.

When the selection condition at least includes that the total number of subblocks of the data to be downloaded saved in the candidate peer is larger than a second threshold, the second selecting module 25 is configured to, when the number of candidate peers selected by the first selecting module 23 is larger than the maximum value, order the candidate peers selected from large to small according to the total number of subblocks of the data to be downloaded, reselect the first M candidate peers, and send the peer information corresponding to the M candidate peers reselected to the list sending module 24, where M is a positive integer and is no larger than the maximum value. The subblocks of the data to be downloaded saved in the candidate peer are: the subblocks after the starting subblock of the data to be downloaded.

Embodiment 14

Embodiment 14 of the invention further provides a peer device, where the peer device may be regarded as the selectable peer concerned in the above embodiments when being able to upload data to other peer devices; furthermore, the peer device may also be the request peer concerned in the above embodiments.

Figure 8:
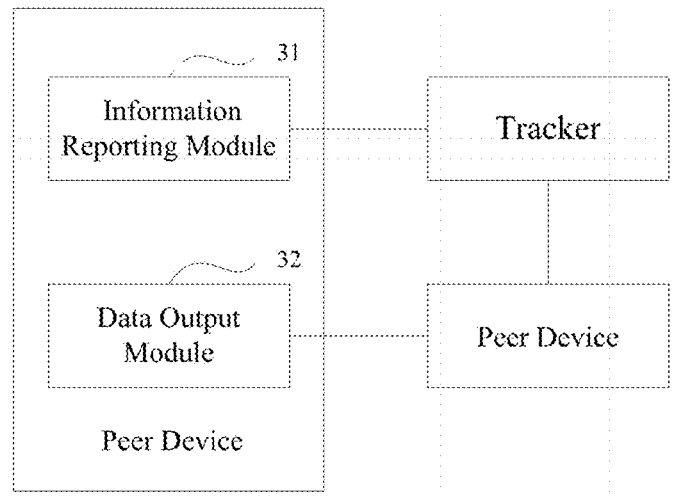
FIG. 8 is a structural representation of a peer device according to Embodiment 14 of the invention.

As shown in FIG. 8, the peer device in Embodiment 14 includes an information reporting module 31 and a data output module 32, where the information reporting module 31 is configured to report the number of continuous subblocks buffered and the sequence number of the first subblock of the continuous subblocks to a tracker; and the data output module 32 is configured to upload data to other peer devices according to requests from other peer devices.

Moreover, the information reporting module 31 is further configured to report one or a combination of the following information to the tracker:

whether the number of connection peers of the peer device is saturated; and the total number of the subblocks buffered on the peer device.

When the peer device of this embodiment acts as a request peer, it may also include a requesting module, configured to send a Peerlist request to a tracker, and request for downloading data from other peer devices in the Peerlist returned by the tracker when receiving the Peerlist.

Embodiment 15

Embodiment 15 of the invention further provides a system based on the same inventive conception as Embodiment 5 to Embodiment 11, and the structural representation of the system is the same as that of the system of Embodiment 12, the system includes a selectable peer 12, a request peer 11 and a tracker 13, where the selectable peer 12 is configured to report the information of the network in which it lies to the tracker 13; the request peer 11 is configured to send a Peerlist request to the tracker 13 and determine at least one candidate peer as an active peer according to the peer information in the Peerlist returned by the tracker 13; and the tracker 13 is configured to, after receiving the Peerlist request, determine the number of the selectable peers 12 that lie in wired networks according to the information of the network in which the selectable peer 12 lies, select candidate peers that meet the selection condition, and return the peer information of the candidate peers selected to the request peer via the Peerlist, where the selection condition includes that: if the number of selectable peers that lie in wired networks is no less than the number of candidate peers required, it selects candidate peers from the selectable peers 12 that lie in wired networks; if the number of selectable peers that lie in wired networks is less than the number of candidate peers required, it takes all the selectable peers that lie in wired networks and at least one selectable peer that lies in a wireless network as the candidate peers.

The selectable peer 12 is further configured to report one or a combination of the following information to the tracker 13:

if the selectable peer lies in a wireless network, it reports the battery continuation time;

the data processing speed of the selectable peer;

the storage space size and the memory size of the selectable peer;

the time length from the moment the selectable peer lately logs on the tracker to the current moment;

the data upload efficiency of the selectable peer; and the network bandwidth of the network in which the selectable peer lies.

Correspondingly, the tracker 13 is further configured to select the candidate peers according to one or more of the following conditions:

if the candidate peer lies in a wireless network, the battery continuation time of the candidate peer is larger than a first time length;

the data processing speed of the candidate peer is larger than a given speed;

the storage space size of the candidate peer is larger than a first numerical value, and the memory size thereof is larger than a second numerical value;

the time length from the moment the candidate peer lately logs on the tracker to the current moment is larger than a second time length;

the data upload efficiency of the candidate peer is larger than a given efficiency value; and the network bandwidth of the network in which the candidate peer lies is larger than a given bandwidth value.

The system concerned in Embodiment 15 may be integrated with the system concerned in Embodiment 12, and the selectable peer 12 may report the information reported in Embodiment 12 and Embodiment 15 to the tracker 13; and the tracker 13 may select candidate peers according to the selection conditions in Embodiment 12 and Embodiment 15.

Embodiment 16

Figure 9:
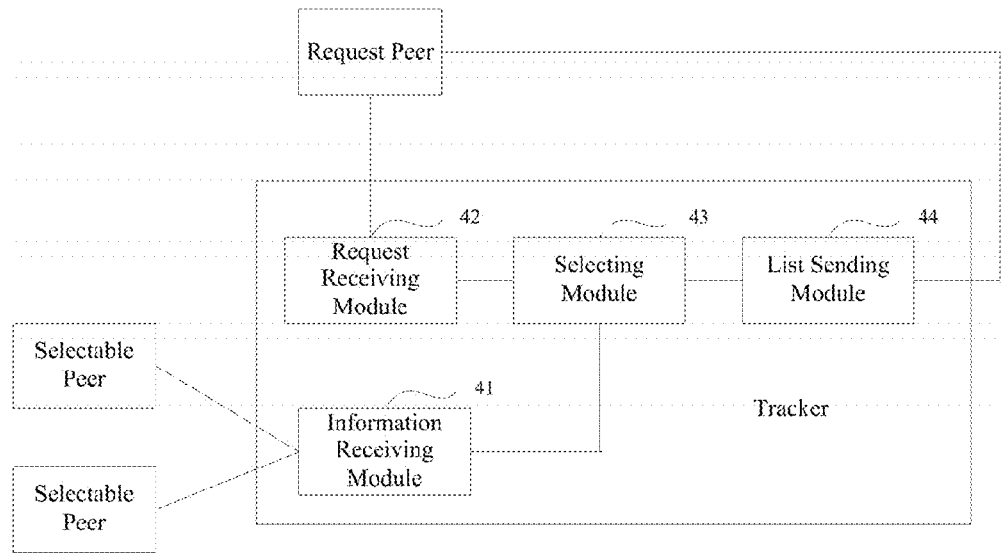
FIG. 9 is a structural representation of a tracker according to Embodiment 16 of the invention.

Embodiment 16 of the invention further provides a tracker based on the same inventive conception as Embodiment 5 to Embodiment 11, which is applicable to a P2P streaming media system; as shown in FIG. 9, the tracker includes an information receiving module 41, a request receiving module 42, a selecting module 43 and a list sending module 44, where the information receiving module 41 is configured to receive the information of the network in which the selectable peer lies reported by the selectable peer; the request receiving module 42 is configured to receive a Peerlist request; the selecting module 43 is configured to determine the number of selectable peers that lie in wired networks according to the information of the network in which the selectable peer lies, and select candidate peers that meet the selection condition, where the selection condition includes that: if the number of the peers that lie in wired networks is no less than the number of candidate peers required, it selects candidate peers from the peers that lie in wired networks; if the number of the peers that lie in wired networks is less than the number of candidate peers required, it takes all the peers that lie in wired networks and at least one peer that lies in a wireless network as candidate peers; and the list sending module 44 is configured to return the peer information of the candidate peers selected to the request peer via the Peerlist.

The information receiving module 41 is further configured to receive one or a combination of the following information:

if the selectable peer lies in a wireless network, it reports the battery continuation time;

the data processing speed of the selectable peer;

the storage space size and the memory size of the selectable peer;

the time length from the moment the selectable peer lately logs on the tracker to the current moment;

the data upload efficiency of the selectable peer; and the network bandwidth of the network in which the selectable peer lies.

The selecting module 43 is further configured to select the candidate peers according to one or more of the following conditions:

if the candidate peer lies in a wireless network, the battery continuation time of the candidate peer is larger than a first time length;

the data processing speed of the candidate peer is larger than a given speed;

the storage space size of the candidate peer is larger than a first numerical value, and the memory size thereof is larger than a second numerical value;

the time length from the moment the candidate peer lately logs on the tracker to the current moment is larger than a second time length;

the data upload efficiency of the candidate peer is larger than a given efficiency value; and the network bandwidth of the network in which the candidate peer lies is larger than a given bandwidth value.

The tracker concerned in Embodiment 16 may be integrated with the tracker concerned in Embodiment 13, and the information receiving module 41 may receive the information concerned in Embodiment 13 and Embodiment 16; the selecting module 43 may include a first selecting module 23 and a second selecting module 25, and select the candidate peers according to the selection conditions in Embodiment 13 and Embodiment 16.

Embodiment 17

Embodiment 17 of the invention further provides a peer device based on the same inventive conception as Embodiment 5 to Embodiment 11, where the peer device may be regarded as the selectable peer concerned in the above embodiments when being able to upload data to other peer devices; furthermore, the peer device may also be the request peer concerned in the above embodiments.

The structure of the peer device in Embodiment 17 is the same as that of the peer device in Embodiment 14, which includes an information reporting module 31 and a data output module 32, where the information reporting module 31 is configured to report the information of the network in which it lies to a tracker; and the data output module 32 is configured to upload data to other peer devices according to requests from other peer devices.

Moreover, the information reporting module 31 is further configured to report one or a combination of the following information to the tracker:

if the peer device lies in a wireless network, it reports the battery continuation time;

the data processing speed of the peer device;

the storage space size and the memory size of the peer device;

the time length from the moment the peer device lately logs on the tracker to the current moment;

the data upload efficiency of the peer device; and the network bandwidth of the network in which the peer device lies.

When the peer device of this embodiment acts as a request peer, it may also include a requesting module, configured to send a Peerlist request to a tracker and request for downloading data from other peer devices in the Peerlist returned by the tracker when receiving the Peerlist.

The peer device concerned in Embodiment 17 may be the peer device concerned in Embodiment 14, and the information reporting module 31 may report the information concerned in Embodiment 14 and Embodiment 17 to the tracker.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

The invention claimed is:

1. A method for searching an active peer in a P2P streaming media system, wherein, receiving, by a tracker, the number of continuous subblocks buffered by a selectable peer and a sequence number of the first subblock of the continuous subblocks;

the method for searching an active peer comprises:

receiving, by the tracker, a Peerlist request sent by a request peer, selecting, by the tracker, a plurality of selectable peers as candidate peers according to a sequence number of a starting subblock of data to be downloaded by the request peer which is contained in the Peerlist request, wherein, the starting subblock of the data to be downloaded is buffered in the candidate peers; and returning, by the tracker, peer information of the candidate peers to the request peer via a Peerlist, and instructing the request peer to determine at least one candidate peer as an active peer according to the peer information in the Peerlist, wherein after selecting by the tracker the candidate peers and before returning the Peerlist to the request peer, the method further comprises:

when the number of the candidate peers is larger than a maximum value, the tracker reselects the candidate peers, the number of candidate peers reselected is no larger than the maximum value; or when the number of the candidate peers is larger than the maximum value, the tracker orders the candidate peers from large to small according to the number of continuous subblocks buffered, and reselects the first N candidate peers, wherein N is a positive integer and is no larger than the maximum value; or when the number of the candidate peers is larger than the maximum value, the tracker orders the candidate peers from large to small according to the total number of subblocks of the data to be downloaded, and reselects the first M candidate peers, wherein M is a positive integer and is no larger than the maximum value;

and wherein the tracker returns the Peerlist to the request peer comprises:

the tracker returns peer information of the candidate peers reselected to the request peer via a Peerlist.

2. The method according to claim 1, further comprising: before searching an active peer,
receiving, by the tracker, one or a combination of the following information reported by the selectable peer:
the total number of subblocks buffered by the selectable peer;
whether the number of connection peers of the selectable peer is saturated;
information of a network in which the selectable peer lies;
if the selectable peer lies in a wireless network, the selectable peer reports battery continuation time;
a data processing speed of the selectable peer;
a storage space size and a memory size of the selectable peer;
a time length from a moment the selectable peer lately logs on the tracker to a current moment;
data upload efficiency of the selectable peer; and
a network bandwidth of the network in which the selectable peer lies;
after the tracker selects the candidate peers and before the tracker returns the Peerlist to the request peer, the tracker further screens the candidate peers according to one or more of the following conditions:
the number of connection peers of the candidate peer is unsaturated, wherein the number of connection peers is the number of other peers that obtain data from the candidate peer;
the number of continuous subblocks buffered in the candidate peer is larger than a first threshold;
the total number of subblocks buffered in the candidate peer is larger than a second threshold;
if the number of candidate peers that lie in wired networks is no less than the number of candidate peers required, the tracker selects candidate peers from the candidate peers that lie in wired networks; and, if the number of candidate peers that lie in wired networks is less than the number of candidate peers required, the tracker takes all the candidate peers that lie in wired networks and at least one candidate peer that lies in a wireless network as the candidate peers;
if the candidate peer lies in a wireless network, the battery continuation time of the candidate peer is larger than a first time length;
the data processing speed of the candidate peer is larger than a given speed;
the storage space size of the candidate peer is larger than a first numerical value, and the memory size of the candidate peer is larger than a second numerical value;
the time length from the moment the candidate peer lately logs on the tracker to the current moment is larger than a second time length;
the data upload efficiency of the candidate peer is larger than a given efficiency value; and
the network bandwidth of the network in which the candidate peer lies is larger than a given bandwidth value.

3. A system for searching an active peer in a P2P streaming media system, comprising a request peer, a selectable peer and a tracker, wherein:
the selectable peer is configured to report the number of continuous subblocks buffered and a sequence number of the first subblock of the continuous subblocks to the tracker;
the request peer is configured to send a Peerlist request to the tracker and determine at least one candidate peer as an active peer according to peer information in a Peerlist returned by the tracker; and
the tracker is configured to select a plurality of selectable peers as candidate peers according to a sequence number of a starting subblock of data to be downloaded by the request peer which is contained in the Peerlist request after receiving the Peerlist request, wherein the candidate peers buffer the starting subblock of the data to be downloaded, and return peer information of the candidate peers selected to the request peer via the Peerlist,
wherein when the number of the candidate peers is larger than a maximum value, the tracker is further configured to reselect the candidate peers, the number of candidate peers reselected is no larger than the maximum value; or
when the number of the candidate peers is larger than the maximum value, the tracker is further configured to order the candidate peers from large to small according to the number of continuous subblocks buffered, and reselect the first N candidate peers, wherein N is a positive integer and is no larger than the maximum value; or
when the number of the candidate peers is larger than the maximum value, the tracker is further configured to order the candidate peers from large to small according to the total number of subblocks of the data to be downloaded, and reselect the first M candidate peers, wherein M is a positive integer and is no larger than the maximum value;
and wherein the tracker is further configured to return peer information of the candidate peers reselected to the request peer via a Peerlist.

4. The system according to claim 3, wherein:
the selectable peer is further configured to report one or a combination of the following information to the tracker:
whether the number of connection peers of the selectable peer is saturated;
the total number of subblocks buffered by the selectable peer;
information of a network in which the selectable peer lies;
if the selectable peer lies in a wireless network, the selectable peer reports battery continuation time;
a data processing speed of the selectable peer;
a storage space size and a memory size of the selectable peer;
a time length from a moment the selectable peer lately logs on the tracker to a current moment;
data upload efficiency of the selectable peer;
a network bandwidth of the network in which the selectable peer lies;
the tracker is further configured to select the candidate peers according to one or more of the following conditions:

the number of connection peers of the candidate peer is unsaturated, wherein the number of connection peers is the number of other peers that obtain data from the candidate peer;

the number of continuous subblocks buffered in the candidate peer is larger than a first threshold;

the total number of subblocks buffered in the candidate peer is larger than a second threshold;

if the number of candidate peers that lie in wired networks is no less than the number of candidate peers required, the tracker selects candidate peers from the candidate peers that lie in wired networks; and, if the number of candidate peers that lie in wired networks is less than the number of candidate peers required, the tracker takes all the candidate peers that lie in wired networks and at least one candidate peer that lies in a wireless network as the candidate peers;

if the candidate peer lies in a wireless network, the battery continuation time of the candidate peer is larger than a first time length;

the data processing speed of the candidate peer is larger than a given speed;

the storage space size of the candidate peer is larger than a first numerical value, and the memory size of the candidate peer is larger than a second numerical value;

the time length from the moment the candidate peer lately logs on the tracker to the current moment is larger than a second time length;

the data upload efficiency of the candidate peer is larger than a given efficiency value; and the network bandwidth of the network in which the candidate peer lies is larger than a given bandwidth value.

* * * * *